United States Patent
Matsui et al.

(10) Patent No.: US 9,001,131 B2
(45) Date of Patent: Apr. 7, 2015

(54) INFORMATION PROCESSING DEVICE, IMAGE TRANSMISSION METHOD AND IMAGE TRANSMISSION PROGRAM

(75) Inventors: Kazuki Matsui, Kawasaki (JP); Kenichi Horio, Yokohama (JP); Ryo Miyamoto, Kawasaki (JP); Tomoharu Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 295 days.

(21) Appl. No.: 13/549,605

(22) Filed: Jul. 16, 2012

(65) Prior Publication Data

US 2013/0063447 A1 Mar. 14, 2013

(30) Foreign Application Priority Data

Sep. 12, 2011 (JP) .................................. 2011-198799

(51) Int. Cl.
*G06T 13/00* (2011.01)
*H04L 29/08* (2006.01)

(52) U.S. Cl.
CPC ..................................... *H04L 67/36* (2013.01)

(58) Field of Classification Search
CPC ................... H04N 19/0026; H04N 19/00248; H04N 19/00921; H04N 21/234381; H04N 21/2402; H04N 21/23412; G06F 13/00; G06T 2207/10016; G06T 13/00; H04L 41/0896; G09G 2340/02; G09G 2370/022; G09G 2350/00; G11B 27/005
USPC .......................................... 345/473; 715/972
See application file for complete search history.

(56) References Cited

U.S. PATENT DOCUMENTS

2004/0151390 A1* 8/2004 Iwamura ........................ 382/236
2007/0268824 A1* 11/2007 Kodaka et al. ................ 370/229
2010/0111410 A1* 5/2010 Lu et al. ........................ 382/166

FOREIGN PATENT DOCUMENTS

JP          9-130767 A      5/1997
JP       2004-214755 A      7/2004
JP        2007-74086 A      3/2007

* cited by examiner

*Primary Examiner* — Kee M Tung
*Assistant Examiner* — Haixia Du
(74) *Attorney, Agent, or Firm* — Fujitsu Patent Center

(57) ABSTRACT

An information processing device includes a memory; and a processor coupled to the memory, wherein the processor executes a process comprising: drawing an image representing a processing result based on software into an image memory; identifying a high-frequency change area; animating an image of the high-frequency change area; adding time information to an image of a change area having a change or the image of the high-frequency change area animated, and transmits the image to a terminal device; receiving the time information from the terminal device; determining based on a difference between the received time information and a reception time of the time information whether image drawing delay occurs; and starting an animation of the change area when the image drawing delay occurs and the animation is not being executed or changes an image transmission interval when the image drawing delay occurs and the animation is being executed.

5 Claims, 11 Drawing Sheets

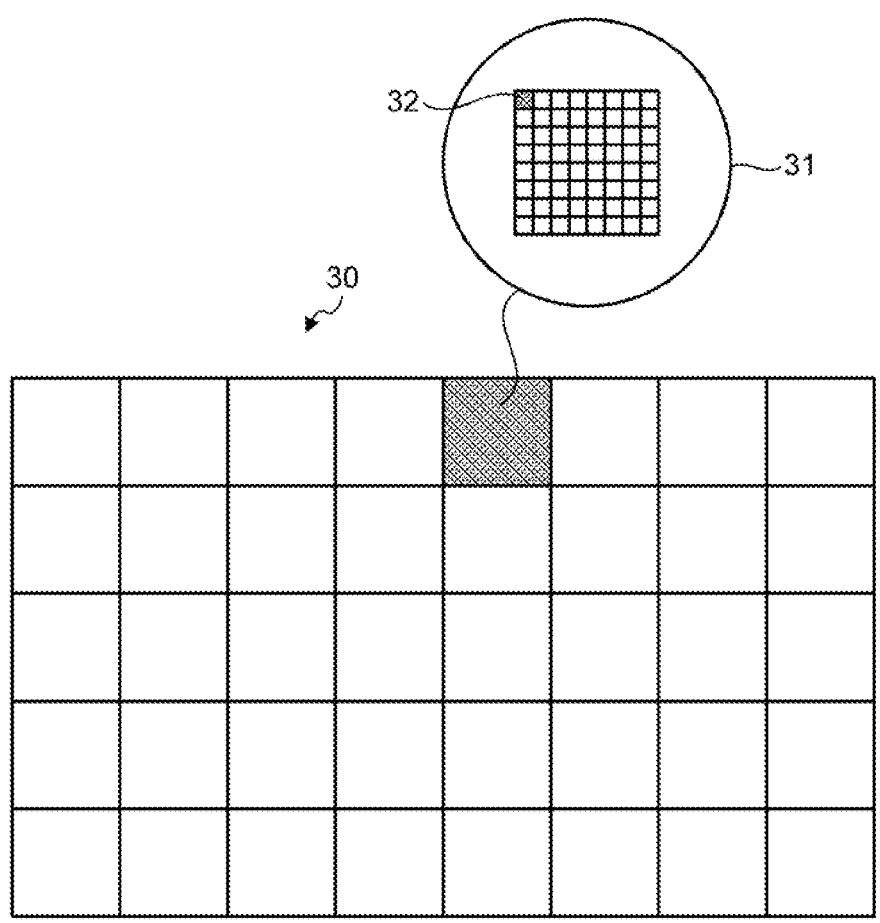

FIG.4
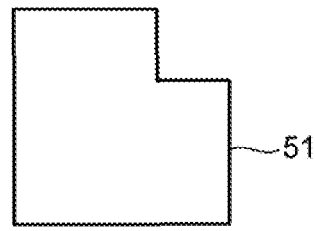
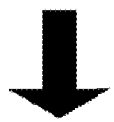
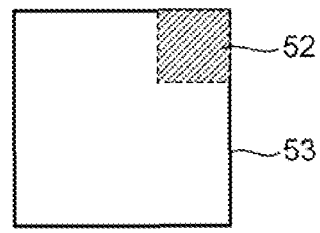
FIG.5
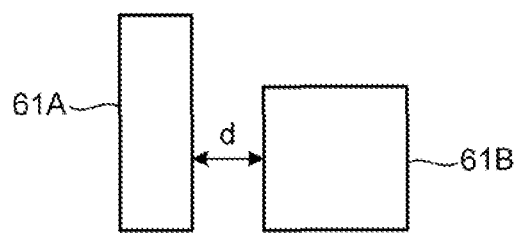
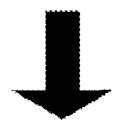
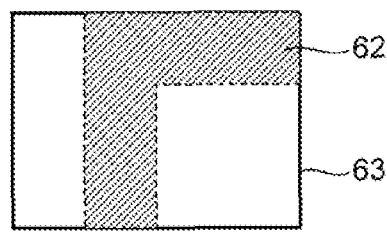

INFORMATION PROCESSING DEVICE, IMAGE TRANSMISSION METHOD AND IMAGE TRANSMISSION PROGRAM

CROSS-REFERENCE TO RELATED APPLICATION

This application is based upon and claims the benefit of priority of the prior Japanese Patent Application No. 2011-198799, filed on Sep. 12, 2011, the entire contents of which are incorporated herein by reference.

FIELD

The embodiments discussed herein are related to an information processing device, an image transmission method and an image transmission program.

BACKGROUND

A system called as a thin client system is known. The thin client system is configured so that a client is provided with only a minimum function and resources such as applications and files are managed at a server side.

According to the thin client system, a client acts as if the client executes processing and holds data as a main body although a server actually makes the client display results of processing executed by the server and data held in the server.

As described above, when screen data which the client is made to display are transmitted between the server and the client, congestion occurs in a network between the server and the client, so that transmission delay may occur. This transmission delay of the network causes drawing of the screen data transmitted from the server to be delayed at the client side. Therefore, the response to operations executed at the client side deteriorates.

A dynamic encoding rate changing method for dynamically changing the encoding bit amount, sampling frequency, frame rate and the like of media stream data in conformity with a network band has been disclosed as an example of a technology for suppressing transmission delay of a network. In this dynamic encoding rate changing method, encoding control data are delivered between terminals every fixed period. For example, a terminal at the reception side receives encoding control data containing a header, a transmission time, a request sampling frequency, a request frame rate, a request bit rate and the like from a terminal at the transmission side. The terminal at the reception side generates encoding control data containing optimum frame rate and bit rate based on an analysis result of the network band analyzed by using the encoding control data, and then transmits the optimum encoding control data to the terminal at the transmission side. Thereafter, the terminal at the transmission side encodes audio data and video data in accordance with the encoding control data received from the terminal at the reception side to generate media stream data, and transmits the generated media stream data to the terminal at the reception side.

Patent Document 1: Japanese Laid-open Patent Publication No. 2004-214755

However, the thin client system has a problem that it is impossible to suppress delay of drawing on a screen at a client side without damaging operation response of the thin client as described below.

That is, it may be considered that the dynamic encoding rate changing method is applied to the thin client system to suppress the transmission delay of the network. When the network band between the server and the client narrows under the application of the dynamic encoding rate changing method, the frame rate of the screen data to be transmitted from the server to the client is uniformly reduced. This uniform reduction of the frame rate increases the update interval of the screen at the client side even when the drawing delay of the screen at the client side can be suppressed by suppressing the transmission delay of the network, so that the operation response of the thin client is deteriorated.

SUMMARY

According to an aspect of the embodiments, An information processing device includes a memory; and a processor coupled to the memory, wherein the processor executes a process comprising: drawing an image representing a processing result based on software into an image memory that stores an image; identifying a high-frequency change area in which a frequency of inter-frame change of an image drawn in the image memory is not less than a predetermined threshold value; animating an image of the high-frequency change area out of the image drawn in the image memory; adding time information to an image of a change area having a change or the image of the high-frequency change area animated out of the image drawn in the image memory or any combination thereof, and transmits the image to a terminal device connected through a network; receiving the time information from the terminal device; determining based on a difference between the received time information and a reception time of the time information whether image drawing delay occurs in the terminal device; and starting an animation of the change area when the image drawing delay occurs and the animation is not being executed or changes an image transmission interval to a transmission interval longer than a transmission interval before the change when the image drawing delay occurs and the animation is being executed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram depicting the gist of division of a desktop screen;

FIG. 4 is a diagram depicting the gist of correction of a mesh joint body;

FIG. 5 is a diagram depicting the gist of combination of candidates of a high-frequency change area;

DESCRIPTION OF EMBODIMENTS

Preferred embodiments will be explained with reference to accompanying drawings. These embodiments do not limit the disclosed technology. The respective embodiments may be properly combined with one another to the extent that the processing contents thereof are not inconsistent with one another.

First Embodiment

System Construction

Figure 1:
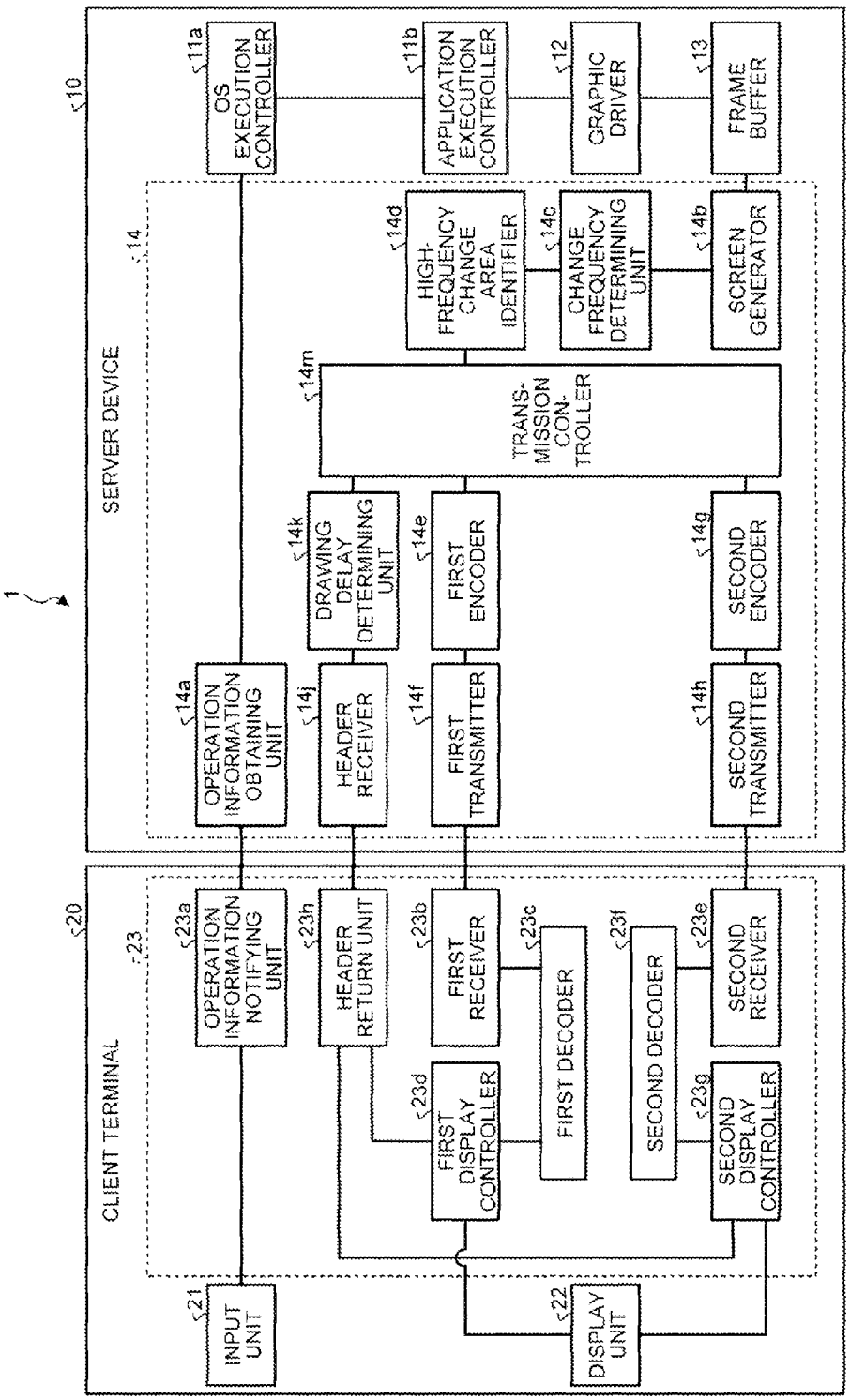
FIG. 1 is a block diagram depicting the functional construction of each device contained in a thin client system according to a first embodiment.

First, the construction of a thin client system according to the present embodiment will be described. FIG. 1 is a block diagram depicting the functional construction of each device contained in the thin client system according to the first embodiment.

In a thin client system 1 depicted in FIG. 1, the screen (display frame) displayed by a client terminal 20 is remotely controlled by a server device 10. That is, according to the thin client system 1, the client terminal 20 acts as if it executes processing and holds data as a main body although the server device 10 actually makes the client terminal 20 display results of processing executed by the server device 10 and data held in the server device.

As depicted in FIG. 1, the thin client system 1 has the server device 10 and the client terminal 20. In the example of FIG. 1, one client terminal 20 is connected to one server device 10. However, any number of client terminals may be connected to one server device 10.

The server device 10 and the client terminal 20 are connected to each other through a predetermined network so that they can mutually communicate with each other. Any kinds of communication networks such as the Internet, LAN (Local Area Network) and VPN (Virtual Private Network) may be adopted as the network irrespective of wired or wireless styles. It is assumed that an RFB (Remote Frame Buffer) protocol in VNC is adopted as a communication protocol between the server device 10 and the client terminal 20, for example.

The server device 10 is a computer that supplies a service for remotely controlling a screen to be displayed on the client terminal 20. An application for remote screen control for servers is installed or pre-installed in the server device 10. In the following description, the application for remote screen control for servers will be referred to as "the remote screen control application at the server side."

The remote screen control application at the server side has a function of supplying a remote screen control service as a basic function. As an example, the remote screen control application at the server side obtains operation information at the client terminal 20 and then makes an application operating in the device at the server side execute processing requested by the operation based on the operation information. Furthermore, the remote screen control application at the server side generates a screen for displaying results of the processing executed by the application, and then transmits the generated screen to the client terminal 20. At this time, the remote screen control application at the server side transmits the area corresponding to an assembly of pixels at a portion at which a bit map image displayed on the client terminal 20 before a present screen is generated is changed, that is, transmits an image of an update rectangle. In the following description, a case where the image of the updated portion is formed of a rectangular image will be described as an example. However, the disclosed device is applicable to a case where the updated portion has a shape other than the rectangular shape.

In addition, the remote screen control application at the server side also has a function of compressing data of a portion having a large inter-frame motion to compression type data suitable for moving pictures and then transmitting the compressed data to the client terminal 20. As an example, the remote screen control application at the server side divides the screen generated from the result of the processing executed by the application into plural areas, and monitors the frequency of changes for each of the divided area. At this time, the remote screen control application at the server side transmits attribute information of an area having a change frequency exceeding a threshold value, that is, a high-frequency change area to the client terminal 20.

In addition to this processing, the remote screen control application at the server side encodes the bit map image in the high-frequency change area to MPEG type data such as MPEG-2 or MPEG-4, and then transmits the encoded data to the client terminal 20. In the foregoing description, the compression to the MPEG (Moving Picture Experts Group) type data is described as an example. However, this embodiment is not limited to this style, and for example, any compression encoding system such as Motion-JPEG (Joint Photographic Experts Group) may be adopted insofar as it is a compression type suitable for moving pictures.

The client terminal 20 is a computer at a reception side which receives a remote screen control service from the server device 10. A fixed terminal such as a personal computer or a mobile terminal such as a cellular phone, PHS (Personal Handyphone System) or PDA (Personal Digital Assistant) may be adopted as an example of the client terminal 20. A remote screen control application suitable for a client is installed or pre-installed in the client terminal 20. In the following description, the application for remote screen control for a client will be referred to as "remote screen control application at the client side."

The remote screen control application at the client side has a function of notifying operation information received through various kinds of input devices such as a mouse and a keyboard to the server device 10. As an example, the remote screen control application at the client side notifies, as the operation information, right or left click, double click or drag of the mouse and the amount of movement of the mouse cursor obtained through a moving operation of the mouse. As another example, the amount of rotation of a mouse wheel, the type of a pushed key of the keyboard and the like are also notified as the operation information.

Furthermore, the remote screen control application at the client side has a function of displaying images received from the server device 10 on a predetermined display unit. As an example, when a bit map image of an update rectangle is received from the server device 10, the remote screen control application at the client side displays the image of the update rectangle while the image concerned is positioned to a changed portion of the previously displayed bit map image. As another example, when attribute information of a high-frequency change area is received from the server device 10, the remote screen control application at the client side sets the area on the display screen corresponding to the position contained in the attribute information as a blank area which is not a display target of the bit map image (hereinafter referred to as an "out-of-display-target"). Under this condition, when receiving the compression type data suitable for moving pictures, the remote screen control application at the client side decodes the data concerned and then displays the decoded data on the blank area.

Construction of Server Device

Next, the functional construction of the server device according to this embodiment will be described.

As depicted in FIG. 1, the server device 10 has an OS execution controller 11a, an application execution controller 11b, a graphic driver 12, a frame buffer 13 and a remote screen controller 14. In the example of FIG. 1, it is assumed that the thin client system contains various kinds of functional parts provided to an existing computer, for example, functions such as various kinds of input devices and display devices in addition to the functional parts depicted in FIG. 1.

The OS execution controller 11a is a processor for controlling execution of OS (Operating System). As an example, the OS execution controller 11a detects a start instruction of an application and a command to the application from operation information obtained by an operation information obtaining unit 14a described later. For example, when detecting double click on an icon of an application, the OS execution controller 11a instructs the application execution controller 11b described later to start the application corresponding to the icon. Furthermore, when detecting an operation of requesting execution of a command on an operation screen of an application being operated, that is, on a so-called window, the OS execution controller 11a instructs the application execution controller 11b to execute the command.

The application execution controller 11b is a processor for controlling execution of an application based on an instruction from the OS execution controller 11a. As an example, the application execution controller 11b operates an application when the application is instructed to start by the OS execution controller 11a or execution of a command is instructed to an application under operation. The application execution controller 11b requests the graphic driver 12 described later to draw a display image of a processing result obtained through execution of the application on the frame buffer 13. When drawing is requested to the graphic driver 12 as described above, the application execution controller 11b notifies not only a display image, but also the drawing position of the display image to the graphic driver 12.

The application executed by the application execution controller 11b may be pre-installed or installed after the server device 10 is shipped. Furthermore, the application may be an application operating under a network environment such as JAVA (registered trademark).

The graphic driver 12 is a processor for executing drawing processing on the frame buffer 13. As an example, when accepting a drawing request from the application execution controller 11b, the graphic driver 12 draws the display image as a processing result of the application in a bit map format at a drawing position on the frame buffer 13 which is indicated by the application. In the foregoing description, the drawing request is accepted by the application. However, a drawing request from the OS execution controller 11a may be accepted. For example, when accepting a drawing request based on the mouse cursor from the OS execution controller 11a, the graphic driver 12 draws the display image based on the mouse cursor in a bit map format at a drawing position on the frame buffer 13 which is indicated by OS.

The frame buffer 13 is a memory device for storing a bit map image drawn by the graphic driver 12. A semiconductor memory element such as VRAM (Video Random Access Memory), RAM (Random Access Memory), ROM (Read Only Memory) or a flash memory is known as an example of the frame buffer 13. A memory device such as a hard disk or an optical disk may be adopted as the frame buffer 13.

The remote screen controller 14 is a processor for supplying a remote screen control service to the client terminal 20 through the remote screen control application at the server side. As depicted in FIG. 1, the remote screen controller 14 has an operation information obtaining unit 14a, a screen generator 14b, a change frequency determining unit 14c and a high-frequency change area identifier 14d. Furthermore, the remote screen controller 14 has a first encoder 14e, a first transmitter 14f, a second encoder 14g, a second transmitter 14h, a header receiver 14j, a drawing delay determining unit 14k and a transmission controller 14m.

The operation information obtaining unit 14a is a processor for obtaining operation information from the client terminal 20. Right or left click, double click or drag of the mouse and the amount of movement of the mouse cursor obtained through a moving operation of the mouse are provided as an example of the operation information. Furthermore, the amount of rotation of a mouse wheel, the type of a pushed key of the keyboard and the like are also notified as another example of the operation information.

The screen generator 14b is a processor for generating a screen image to be displayed on a display unit 22 of the client terminal 20. As an example, the screen generator 14b starts the following processing every time an update interval of the desktop screen, for example, 33 msec elapses. That is, the screen generator 14b compares the desktop screen displayed on the client terminal 20 at the previous frame generation time with the desktop screen written on the frame buffer 13 at the present frame generation time. The screen generator 14b joins and combines pixels at a changed portion of the previous frame and shapes the changed portion in a rectangular shape to generate an image of an update rectangle, and generates a packet for transmission of the update rectangle.

The change frequency determining unit 14c is a processor for determining the inter-frame change frequency every divided area with respect to the image drawn on the frame buffer 13. As an example, the change frequency determining unit 14c accumulates an update rectangle generated by the screen generator 14b into a working internal memory (not depicted) over a predetermined period. At this time, the change frequency determining unit 14c accumulates attribute information capable of specifying the position and size of the update rectangle, for example, the coordinate of the apex at the upper left corner of the update rectangle and the width and height of the update rectangle. The period for which the update rectangle is accumulated has correlation with the identification precision of the high-frequency change area, and erroneous detection of the high-frequency change area is more greatly reduced as the period is longer. In this embodiment, it is assumed that the image of the update rectangle is accumulated over 33 msec (milliseconds), for example.

At this time, when a predetermined period elapses from the accumulation of the image of the update rectangle, the change frequency determining unit 14c determines the change frequency of the desktop screen with a map obtained by dividing the desktop screen to be displayed on the client terminal 20 in a mesh-like fashion.

FIG. 2 is a diagram depicting the gist of division of the desktop screen. Reference numeral 30 in FIG. 2 represents a change frequency determining map. Reference numeral 31 in FIG. 2 represents a mesh contained in the map 30. Reference numeral 32 in FIG. 2 represents one pixel contained in a pixel block forming the mesh 31. In the example depicted in FIG. 2, it is assumed that the change frequency determining unit 14c divides the map 30 into blocks so that each block of 8 pixels×8 pixels out of pixels occupying the map 30 is set as one mesh. In this case, 64 pixels contain one mesh.

Here, the change frequency determining unit 14c successively develops the image of the update rectangle onto the map for determining the change frequency in accordance with the position and size of the updated rectangle accumulated in the working internal memory. The change frequency determining unit 14c accumulates and adds the number of mesh changing times at a portion overlapped with the update rectangle on the map every time the update rectangle is developed onto the map. At this time, when the update rectangle developed on the map is overlapped with the pixels contained in the mesh over a predetermined number of times, the change frequency determining unit 14c increments the number of change times of the mesh by 1. In this embodiment, it is assumed that when the update rectangle is overlapped with at least one pixel contained in the mesh, the number of change times of the mesh is incremented.

Figure 3A:
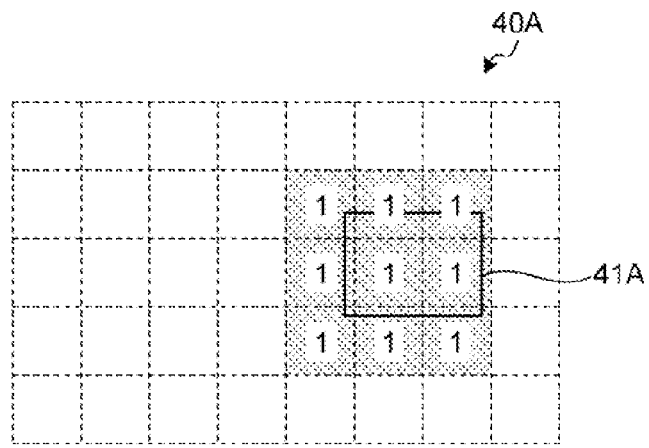
FIG. 3A is a diagram depicting the gist of determination of a change frequency of the desktop screen.
Figure 3B:
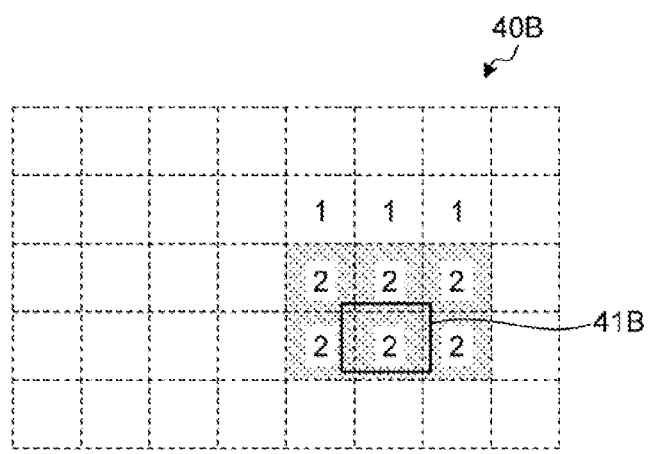
FIG. 3B is another diagram depicting the gist of the determination of the change frequency of the desktop screen.
Figure 3C:
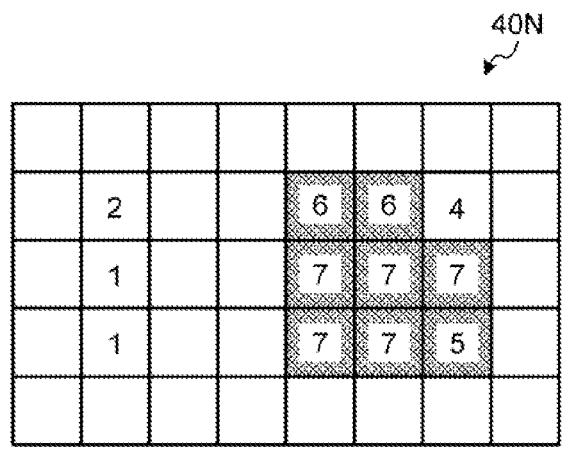
FIG. 3C is another diagram depicting the gist of the determination of the change frequency of the desktop screen.

FIGS. 3A to 3C are diagrams depicting the gist of determination of the change frequency of the desktop screen. Reference numerals 40A, 40B and 40N in FIGS. 3A to 3C represent the change frequency determining maps. Reference numerals 41A and 41B in FIGS. 3A and 3B represent update rectangles. In this embodiment, numerals depicted in meshes of the map 40A represent the change frequencies of the meshes at the time point at which the update rectangle 41A is developed. Furthermore, numerals depicted in meshes of the map 40B represent the change frequencies of the meshes at the time point at which the update rectangle 41B is developed. Furthermore, numerals depicted in meshes of the map 40N represent the change frequencies of the meshes at the time point at which all update rectangles accumulated in the working internal memory are developed. In FIGS. 3A to 3C, it is assumed that the number of change times of a mesh in which no numeral is depicted is zero.

As depicted in FIG. 3A, when the update rectangle 41A is developed on the map 40A, the mesh of a hatched is overlapped with the update rectangle 41A. Therefore, the change frequency determining unit 14c increments the update frequency of the mesh of the hatched portion one by one. In this case, since the number of change times of each mesh is equal to zero, the number of change times of the hatched portion is incremented from 0 to 1. Furthermore, as depicted in FIG. 3B, when the update rectangle 41B is developed on the map 40B, the mesh of a hatched portion is overlapped with the update rectangle 41B. Therefore, the change frequency determining unit 14c increments the number of change times of the mesh of the hatched portion one by one. In this case, the change frequency of each mesh is equal to 1, and thus the number of change times of the hatched portion is incremented from 1 to 2. At the stage that all the update rectangles are developed on the map as described above, the result of the map 40N depicted in FIG. 3C is obtained.

When the development of all the update rectangles accumulated in the working internal memory on the map is finished, the change frequency determining unit 14c obtains a mesh in which the number of change times, that is, the change frequency for the predetermined period exceeds a threshold value. It means that the mesh of the hatched portion is obtained when the threshold value is set to "4" in the example of FIG. 3C. As the threshold value is set to a higher value, a portion at which moving pictures are displayed on the desktop screen with high probability can be encoded by a second encoder 14g described later. With respect to the threshold value, an end user may select a value which is stepwise set by a developer of the remote screen control application, or an end user may directly set a value.

The high-frequency change area identifier 14d is a processor for identifying, as a high-frequency change area, an area which is changed with high frequency on the desktop screen displayed on the client terminal 20.

Specifically, when meshes whose number of change times exceed the threshold value are obtained by the change frequency determining unit 14c, the high-frequency change area identifier 14d corrects a mesh joint body obtained by joining adjacent meshes to a rectangle. As an example, the high-frequency change area identifier 14d derives an interpolation area to be interpolated to the mesh joint body, and then added the interpolation area to the joint body, whereby the mesh joint body is corrected to a rectangle. An algorithm for deriving an area with which the joint body of meshes can be shaped to a rectangle by the minimum interpolation is applied to derive the interpolation area.

FIG. 4 is a diagram depicting the gist of correction of the mesh joint body. Reference numeral 51 in FIG. 4 represents a mesh joint body before correction, reference numeral 52 in FIG. 4 represents an interpolation area, and reference numeral 53 in FIG. 4 represents a rectangle after the correction. As depicted in FIG. 4, the high-frequency change area identifier 14d adds the mesh joint body 51 with the interpolation area 52 to correct the mesh joint body 51 to the rectangle 53. At this stage, the synthesis of a rectangle described later has not been completed, and the rectangle 53 has not yet been settled as the high-frequency change area. Therefore, the rectangle after the correction is called as a candidate of the high-frequency change area.

When plural candidates of the high-frequency change area exist, the high-frequency change area identifier 14d synthesizes a rectangle containing plural candidates of the high-frequency change area which are selected so that the distance between the candidates is equal to a predetermined value or less. Here, the distance between the candidates represents the shortest distance of the rectangles after correction. As an example, the high-frequency change area identifier 14d derives an interpolation area to be filled among the respective candidates when the candidates of the high-frequency change area are combined with one another, and then adds the candidates of the high-frequency change area with the interpolation area, thereby synthesizing the rectangle containing the candidates of the high-frequency change area. An algorithm for deriving an area with which the candidates of the high-frequency change area are shaped to a combination body by the minimum interpolation is applied to derive the interpolation area.

FIG. 5 is a diagram depicting the gist of combination of candidates of a high-frequency change area. Reference numerals 61A and 61B in FIG. 5 represent candidates of the high-frequency change area, reference numeral 62 in FIG. 5 represents an interpolation area, and reference numeral 63 in FIG. 5 represents a combination body of the candidate 61A of the high-frequency change area and the candidate 61B of the high-frequency change area. As depicted in FIG. 5, the high-frequency change area identifier 14d adds the interpolation area 62 to the candidate 61A of the high-frequency change area and the candidate 61B of the high-frequency change area the distance between which is equal to a distance d or less, thereby synthesizing the combination body 63 containing the candidate 61A of the high-frequency change area and the candidate 61B of the high-frequency change area. The high-frequency change area identifier 14d identifies the thus-obtained combination body as the high-frequency change area.

When identifying the high-frequency change area as described above, the high-frequency change area identifier 14d transmits to the client terminal 20 attribute information with which the position and size of the high-frequency change area can be specified, whereby the portion corresponding to the high-frequency change area out of the bit map image of the desktop screen displayed on the client terminal 20 is displayed as a blank. Thereafter, the high-frequency change area identifier 14d clears the number of change times of meshes mapped in the working internal memory. The high-frequency change area identifier 14d registers the attribute information of the high-frequency change area in the working internal memory.

Figure 6A:
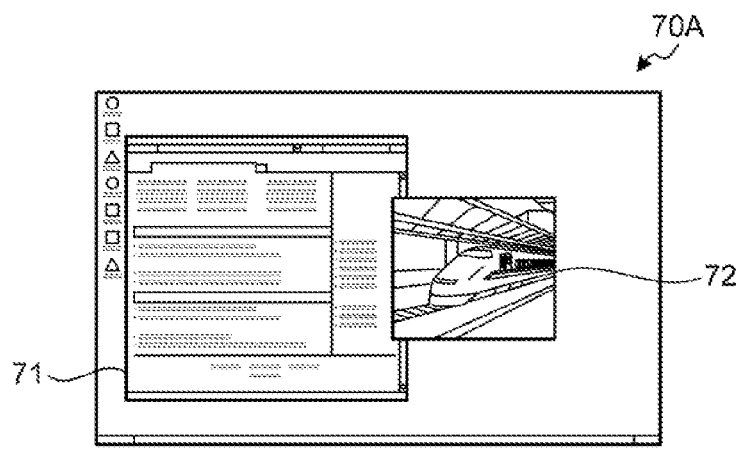
FIG. 6A is a diagram depicting the gist of notification of attribute information of the high-frequency change area.
Figure 6B:
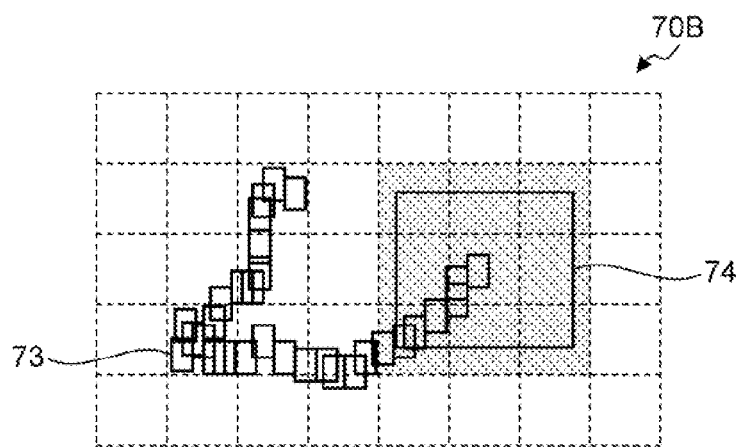
FIG. 6B is another diagram depicting the gist of the notification of the attribute information of the high-frequency change area.
Figure 6C:
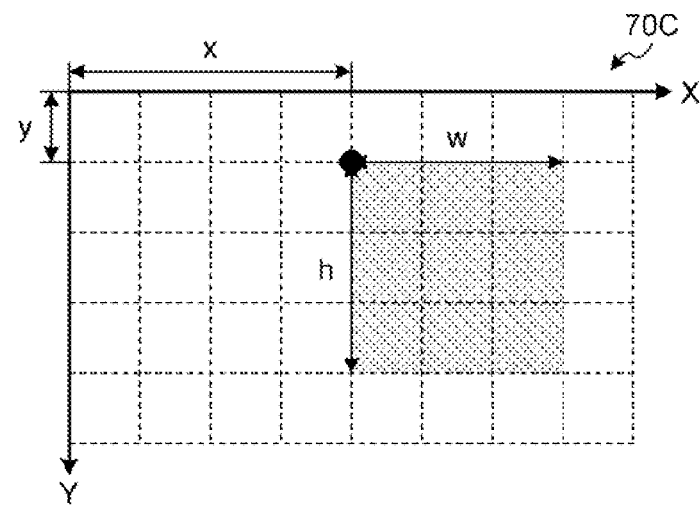
FIG. 6C is another diagram depicting the gist of the notification of the attribute information of the high-frequency change area.

FIGS. 6A to 6C are diagrams depicting the gist of notification of the attribute information of the high-frequency change area. Reference numeral 70A in FIG. 6A represents an example of the desktop screen drawn on the frame buffer 13, and reference numerals 70B and 70C in FIGS. 6B to 6C represent change frequency determining maps. Reference numeral 71 in FIG. 6A represents a browser screen (window), reference numeral 72 in FIG. 6A represents a moving picture reproducing screen (window), reference numeral 73 in FIG. 6B represents a movement locus of the mouse, and reference numeral 74 in FIG. 6B represents a moving picture reproducing area based on an application.

As depicted in FIG. 6A, the desktop screen 70A contains the browser screen 71 and the moving picture reproducing screen 72. When a time-dependent variation is pursued from the desktop screen 70A, no update rectangle is detected on the browser screen 71 as a still picture and update rectangles associated with the movement locus 73 of the mouse and the moving picture reproducing area 74 are detected as depicted in FIG. 6B. In this case, it is assumed that a mesh in which the number of change times exceed the threshold value in the moving picture reproducing area 74, that is, a hatched portion in FIG. 6B is identified by the high-frequency change area identifier 14d. In this case, the high-frequency change area identifier 14d transmits the coordinate (x,y) of the apex at the upper left corner of the high-frequency change area of the hatched portion in FIG. 6C and the width w and height h of the high-frequency change area as the attribute information of the high-frequency change area to the client terminal 20.

In this embodiment, the coordinate of the apex at the upper left corner is adopted as a point for specifying the position of the high-frequency change area, but another apex may be adopted. Any point other than the apex, for example, the center of gravity may be adopted insofar as it can specify the position of the high-frequency change area. Furthermore, the upper left corner on the screen is set as the origin of the coordinate axis XY, but any point within the screen or out of the screen may be adopted as the origin.

When the high-frequency change area is detected at a part of the desktop screen as described above, animation for moving pictures of the high-frequency change area on the desktop screen is started. In this case, the bit map image of the portion corresponding to the high-frequency change area out of the bit map image drawn on the frame buffer 13 is input to the first encoder 14e described later by the transmission controller 14m. On the other hand, with respect to an update rectangle which is not contained in the high-frequency change area, it may be compressed in a still picture compression format as in the case of the stage before the animation for moving pictures is started. That is, the image of the update rectangle which is not contained in the high-frequency change area out of the bit map image drawn on the frame buffer 13 is input to the second encoder 14g described later by the transmission controller 14m described later.

The first encoder 14e is a processor for encoding the image of the update rectangle input from the transmission controller 14m described later in the still picture compression format. As an example, the first encoder 14e compresses the image of each update rectangle in JPEG to encode the image to encoded data of the still picture. In this embodiment, JPEG is exemplified as the still picture compression format, but another format such as GIF (Graphic Interchange Format) or PNG (Portable Network Graphics) may be applied.

The first transmitter 14f is a processor for transmitting the encoded data of the update rectangle encoded by the first encoder 14e to the client terminal 20. As an example, upon instruction of addition of header information by the transmission controller 14m described later, the first transmitter 14f adds the encoded data with header information on frame ID, a timestamp of a transmission time and the like and then transmits them to the client terminal 20 when the encoded data of the update rectangle is transmitted to the client terminal 20. At this time, the first transmitter 14f can add the header information to the encoded data of all the update rectangles encoded by the first encoder 14e, but it may add the header information to the encoded data of at least one update rectangle out of the encoded data of the update rectangles. In the following description, it is assumed as an example that the first transmitter 14f adds the header information to only the encoded data of the finally transmitted update rectangle out of the update rectangles generated from the same bit map image. The "frame ID" represents the frame number of the bit map image drawn on the frame buffer 13. The "transmission time" represents the time at which the encoded data of the update rectangle is transmitted by the first transmitter 14f.

When the header information is added to the encoded data of one update rectangle out of the encoded data of all the update rectangles, the following effect can be implemented. That is, only the header information is returned after the encoded data of moving pictures are decoded and a screen is drawn at the client terminal 20, whereby the drawing delay at the client side can be monitored on a frame basis by the drawing delay determining unit 14k described later. Therefore, the drawing delay can be monitored with harmonizing the tradeoff between the monitoring precision of the drawing delay and each of the traffic of the network and the load of the client terminal 20.

The second encoder 14g is a processor for encoding an image input from the transmission controller 14m described later in a moving picture compression format. As an example, the second encoder 14g compresses an image of a high-frequency change area or change area in MPEG to encode the image to encoded data of a moving picture. In this embodiment, MPEG is exemplified as the moving picture compression format, but another format such as Motion-JPEG may be applied.

When the high-frequency change area is identified by the high-frequency change area identifier 14d, the image of the high-frequency change area is input from the transmission controller 14m described later to the second encoder 14g. When the animation for moving pictures is forcedly started as described above although the high-frequency change area is not identified, the change area determining processing is brought to an end at this stage, and the image of a change area changed within the change frequency determining map is input by the transmission controller 14m described later. That is, at the stage that the animation for moving pictures is forcedly started, the generation of a mesh joint body described above, the correction of the mesh joint body to a rectangle, the synthesis of a rectangle and the like are performed on meshes in which changes occur without performing the threshold value determination based on the number of change times from the change frequency determining map. The thus-obtained image of the change area is input by the transmission controller 14m described later.

The second transmitter 14h is a processor for transmitting the encoded data of the moving picture encoded by the second encoder 14g to the client terminal 20. As an example, when addition of header information is instructed by the transmission controller 14m, the second transmitter 14h adds the header information to at least one encoded data out of the encoded data of moving pictures. When the header information is added to the encoded data of the moving pictures as described above, only the header information is returned after the encoded data of the moving pictures are decoded and the screen is drawn at the client terminal 20, whereby the following effect can be implemented. That is, when the encoded data of the moving pictures are transmitted, the amount of drawing processing executed for the update of the screen increases at the client terminal 20. As described above, the drawing delay at the client terminal 20 can be monitored based on the processing load for the drawing of the encoded data of the moving pictures which is liable to become a bottleneck with respect to the drawing delay in a situation that the drawing delay occurs at the client terminal 20 with high probability.

The header receiver 14j is a processor for receiving the header information returned from the client terminal 20. The header receiver 14j outputs the header information received from the client terminal 20 to the drawing delay determining unit 14k described later.

The drawing delay determining unit 14k is a processor for determining based on the difference between the transmission time contained in the header information received by the header receiver 14j and the reception time of the returned header information whether screen drawing delay occurs at the client terminal 20.

As an example, the drawing delay determining unit 14k calculates the time difference between the transmission time and the reception time by subtracting the transmission time contained in the header information from the reception time at which the returned header information is received. Furthermore, the drawing delay determining unit 14k determines whether the thus-calculated time difference between the transmission time and the reception time is not less than a predetermined threshold value Th1, for example, 100 msec. As described above, based on whether the time difference is not less than the threshold value Th1, it can be determined whether transmission delay of the network and eventually drawing delay caused by the transmission delay occurs. At this time, when the time difference between the transmission time and the reception time is less than the threshold value Th1, the drawing delay determining unit 14k determines whether the time difference between the transmission time and the reception time is not more than a predetermined threshold value Th2, for example, 50 msec over a predetermined number of frames, for example, five frames. As described above, based on whether the time difference is continuously not more than the threshold value Th2 among frames, it can be determined whether the transmission interval can be restored to an original transmission interval when the transmission controller 14m described later drops the transmission interval of the encoded data of moving pictures.

The transmission controller 14m is a processor for controlling transmission of the desktop screen. The transmission controller 14m executes transmission control of the update rectangle and the encoded data of the moving picture by using a transmission interval register (not depicted) in which a still picture transmission interval F1 and a moving picture transmission interval F2 are set. Here, the "transmission interval F1" represents an interval at which the encoded data of still pictures are transmitted from the server device 10 to the client terminal 20. The "transmission interval F2" represents an interval at which the encoded data of moving pictures are transmitted from the server device 10 to the client terminal 20. For example, 33 msec is set as initial values for the still picture transmission interval F1 and the moving picture transmission interval F2 in the transmission interval register.

As an example, the transmission controller 14m controls the change of the moving picture transmission interval F2 in accordance with the determination result of the drawing delay by the drawing delay determining unit 14k. Specifically, when the drawing delay determining unit 14k determines that the time difference is not less than the threshold value Th1, the transmission controller 14m determines whether the animation for moving pictures is being executed. At this time, when the animation has not yet been executed, it can be estimated that the encoded data of the still picture of an update rectangle having a large data amount increases the traffic of the network with high probability. In this case, the transmission controller 14m brings the processing of determining the change frequency to an end at the stage that the determination concerned is executed, and inputs to the second encoder 14g the image of a change area which is changed in the change frequency determining map, thereby forcedly starting the animation. As described above, the control for reducing the traffic of the network is executed by executing the encoding based on the moving picture having a higher compression rate than the encoding based on the still picture. On the other hand, when the animation is executed, it can be estimated that the performance of the client terminal 20 is too deficient to decode the encoded data of the moving picture at the present frame rate. In this case, the transmission controller 14m changes the moving picture transmission interval F2 to a longer transmission interval than that before the change. For example, the transmission controller 14m changes the transmission interval F2 from 33 msec as the initial value to 100 msec. Accordingly, the amount of decoding processing executed by the client terminal 20 is matched with the performance of the client terminal 20, whereby the drawing delay of the screen at the client terminal 20 is suppressed. When the transmission interval F2 has been already lowered from 33 msec as the initial value to 100 msec, 100 msec is maintained.

As described above, when the still picture of the update rectangle compresses the band of the network with high probability, the animation is forcedly started, and when the performance of the client terminal 20 does not follow the decode of moving pictures, the transmission interval of the encoded data of the moving pictures is lengthened. Therefore, the drawing delay of the screen at the client side can be suppressed while reduction of the operation response of the thin client is suppressed.

Furthermore, when it is determined by the drawing delay determining unit 14k that the time difference is not more than the threshold value Th2 over a predetermined number of frames, the transmission controller 14m returns the moving picture transmission interval F2 to the transmission interval before the change. For example, the transmission interval F2 which has been reduced to 100 msec is returned to 33 msec as the initial value by the transmission controller 14m. This is because when the time difference is not more than the threshold value Th2 over a predetermined number of frames, the transmission of the encoded data of still pictures and moving pictures and the decoding of the encoded data of the still pictures and the moving pictures can be estimated to be stable.

As another example, the transmission controller 14m inputs an image to the first encoder 14e or the second encoder 14g. This will be specifically described below. First, the transmission controller 14m reads out the transmission interval F1 and the transmission interval F2 from the transmission interval register. In this case, when the animation is being executed, the transmission controller 14m determines whether a transmission lapse time t2 elapsing from previous transmission of encoded data of moving pictures reaches the transmission interval F2, that is, whether the transmission lapse time t2≥the transmission interval F2 is satisfied or not. At this time, when the transmission lapse time t2≥the transmission interval F2 is satisfied, the transmission controller 14m inputs the image of a high-frequency change area or change area to the second encoder 14g. On the other hand, when the transmission lapse time t2<the transmission interval F2 is satisfied, the transmission controller 14m does not input the image of the high-frequency change area or change area to the second encoder 14g, and waits until the transmission interval F2 lapses.

The transmission controller 14m determines whether the transmission lapse time t1 elapsing from the previous transmission of the encoded data of the image of an upgrade rectangle reaches the transmission interval F1, that is, whether the transmission lapse time t1≥the transmission interval F1 is satisfied. At this time, when the transmission lapse time t1≥the transmission interval F1, the transmission controller 14m inputs to the first encoder 14e the images of update rectangles which are not contained in the high-frequency change area. On the other hand, when the transmission lapse time t1<the transmission interval F1, the transmission controller 14m does not input the images of update rectangles to the first encoder 14e, and waits until the transmission interval F1 elapses.

Thereafter, the transmission controller 14m determines whether any one of the image of the update rectangle and the image of the high-frequency change area or change area is input to the first encoder 14e or the second encoder 14g, that is, whether there is any transmission data. At this time, when some transmission data exists, the transmission controller 14m makes either the first transmitter 14f or the second transmitter 14h add header information. For example, when an image is input to only the first encoder 14e, or when an image is input both the first encoder 14e and the second encoder 14g, the transmission controller 14m instructs the first transmitter 14f to add the header information. On the other hand, when an image is input to only the second encoder 14g, the transmission controller 14m instructs the second transmitter 14h to add header information. Furthermore, when no image is input to each of the first encoder 14e and the second encoder 14g, the transmission controller 14m gives no instruction of adding header information because there is no transmission data.

Various kinds of integrated circuits and electronic circuits may be adopted for the OS execution controller 11a, the application execution controller 11b, the graphic driver 12 and the remote screen controller 14. Some parts of the functional parts contained in the remote screen controller 14 may be implemented by other integrated circuits or electronic circuits. For example, ASIC (Application Specific Integrated Circuit) or FPGA (Field Programmable Gate Array) may be adopted as the integrated circuits. Furthermore, CPU (Central Processing Unit), MPU (Micro Processing Unit) or the like may be adopted as the electronic circuit.

Construction of Client Terminal

Next, the functional construction of the client terminal according to this embodiment will be described. As depicted in FIG. 1, the client terminal 20 has an input unit 21, a display unit 22, a remote screen controller 23 at the client side. In the example of FIG. 1, it is assumed that the various kinds of functional parts provided to an existing computer, for example, functions such as an audio output unit and the like are provided in addition to the functional parts depicted in FIG. 1.

The input unit 21 is an input device for accepting various kinds of information, for example, an instruction input to the remote screen controller 23 at the client side described later. As an example, a keyboard or a mouse may be applied. The display unit 22 described later implements a pointing device function in cooperation with the mouse.

The display unit 22 is a display device for displaying a desktop screen and the like transmitted from the server device 10, for example, and a monitor, a display or a touch panel may be applied.

The remote screen controller 23 is a processor for receiving a remote screen control service supplied form the server device 10 through the remote screen control application at the client side. As depicted in FIG. 1, the remote screen controller 23 has an operation information notifying unit 23a, a first receiver 23b, a first decoder 23c and a first display controller 23d. Furthermore, the remote screen controller 23 has a second receiver 23e, a second decoder 23f, a second display controller 23g and a header return unit 23h.

The operation information notifying unit 23a is a processor for notifying the operation information based on the input unit 21 to the server device 10. As an example, the operation information notifying unit 23a notifies right or left click, double click and drag of the mouse, the movement amount of the mouse cursor obtained through the moving operation of the mouse and the like as operation information. As another example, the operation information notifying unit 23a notifies the rotational amount of the mouse wheel, the type of a pushed key of the keyboard and the like as the operation information.

The first receiver 23b is a processor for receiving the encoded data of the update rectangle transmitted by the first transmitter 14f of the server device 10. As an example, the first receiver 23b takes out the header information from the encoded data of the update rectangle received from the server device 10, and outputs the header information to the first display controller 23d while the first receiver 23b outputs the encoded data of the update rectangle to the first decoder 23c. Accordingly, decoding is skipped for only the header information. The first receiver 23b receives the attribute information of the high-frequency change area transmitted by the high-frequency change area identifier 14d of the server device 10.

The first decoder 23c is a processor for decoding the encoded data of the update rectangle received by the first receiver 23b. A decoder having a decoding system which is matched with the encoding system set up in the server device 10 is mounted in the first decoder 23c.

The first display controller 23d is a processor for making the display unit 22 display the image of the update rectangle decoded by the first decoder 23c. As an example, the first display controller 23d makes the display unit 22 display the bit map image of the update rectangle on a screen area of the display unit 22 which corresponds to the position and the size contained in the attribute information of the update rectangle received by the first receiver 23b. Furthermore, when the attribute information of the high-frequency change area is received by the first receiver 23b, the first display controller 23d executes the following processing. That is, the first display controller 23d sets the screen area of the display unit 22 corresponding to the position and size of the high-frequency change area contained in the attribute information of the high-frequency change area as a blank area which is an out-of-target with respect to display of the bit map image. When the drawing of the screen is finished as described above, the first display controller 23d outputs the header information input from the first receiver 23b to the header return unit 23h described later.

The second receiver 23e is a processor for receiving the encoded data of the moving pictures transmitted by the second transmitter 14h of the server device 10. The second receiver 23e receives the attribute information of the high-frequency change area transmitted by the high-frequency change area identifier 14d of the server device 10.

The second decoder 23f is a processor for decoding the encoded data of the moving pictures received by the second receiver 23e. A decoder having a decoding system matched with the encoding format installed in the server device 10 is mounted in the second decoder 23f.

The second display controller 23g is a processor for making the display unit 22 display the image of the high-frequency change area or change area decoded by the second decoder 23f based on the attribute information of the high-frequency change area which is received by the second receiver 23e. As an example, the second display controller 23g makes the display unit 22 display the image of the moving pictures of the high-frequency change area on the screen area of the display unit 22 corresponding to the position and size of the high-frequency change area contained in the attribute information of the high-frequency change area. When header information is added to the encoded data of the moving pictures, the header information is output to the header return unit 23h described later at the stage that the decoding and the drawing of the screen are finished as in the case of the still pictures.

The header return unit 23h is a processor for returning the header information to the server device 10. As an example, the header return unit 23h transmits the header information input from the server device 10 through the first receiver 23b and the first display controller 23d to the server device 10. As described above, by returning the header information, the transmission delay of the network and eventually the drawing delay of the screen can be estimated from the time difference between the transmission time and the return time at the server device 10 side.

Various kinds of integrated circuits and electronic circuits may be adopted for the remote screen controller 23 at the client side. Furthermore, some parts of functional parts contained in the remote screen controller 23 may be implemented by other integrated circuits or electronic circuits. For example, ASIC or FPGA may be adopted as the integrated circuits, and CPU, MPU or the like may be adopted as the electronic circuits.

Flow of Processing

Next, the procedure of the processing of the thin client system according to this embodiment will be described. In the following description, (1) image transmission processing executed in the server device 10 is described, and then (2) transmission interval changing processing will be described.

(1) Image Transmission Processing

Figure 7:
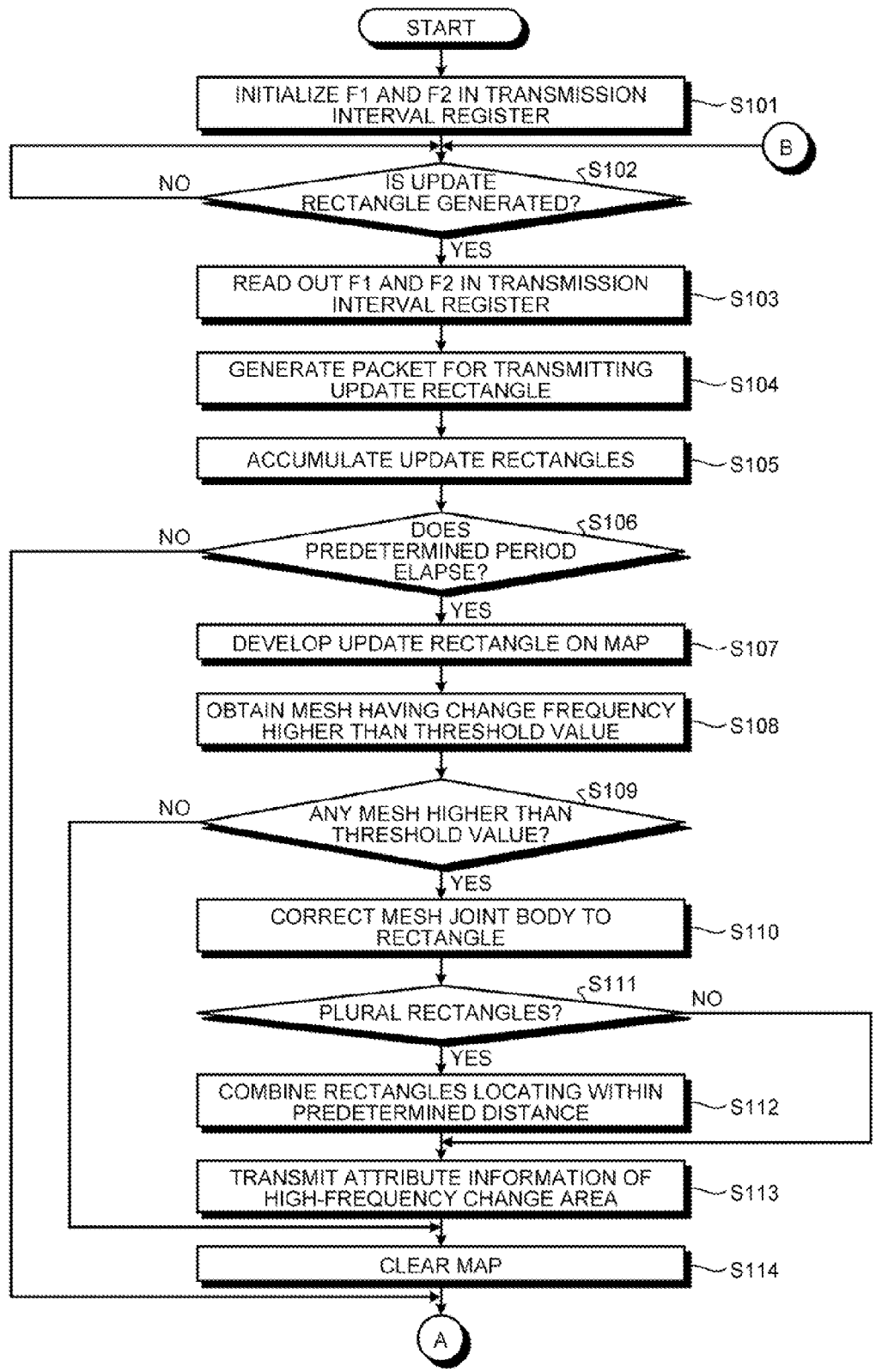
FIG. 7 is a flowchart (1) depicting the procedure of image transmission processing according to a first embodiment.
Figure 8:
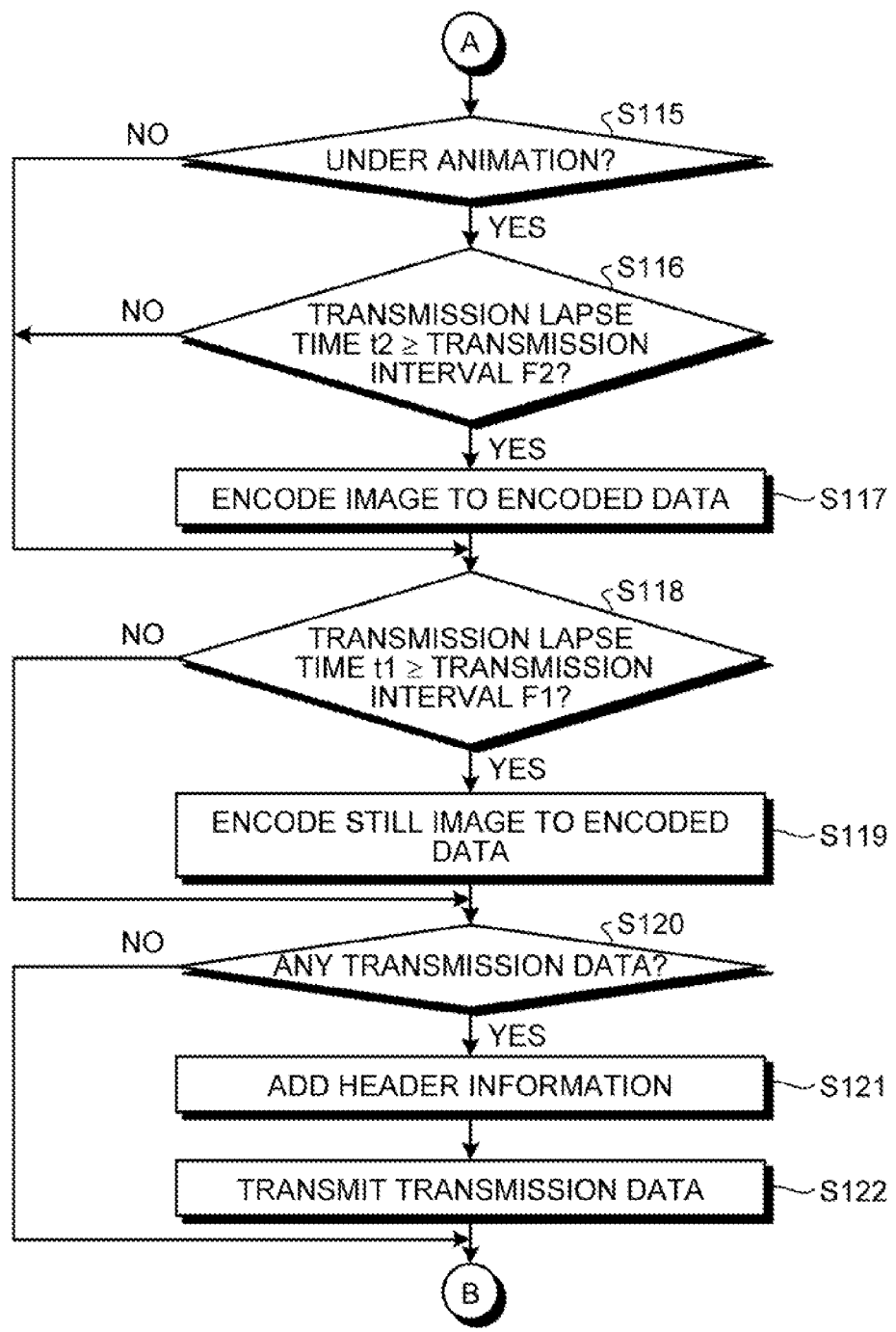
FIG. 8 is a flowchart (2) depicting the procedure of the image transmission processing according to the first embodiment.

FIGS. 7 and 8 are flowcharts depicting the procedure of the image transmission processing according to the first embodiment. The image transmission processing is executed by the server device 10, and it is repetitively executed insofar as the client terminal 20 is being operated.

As depicted in FIG. 7, the server device 10 executes initialization of writing the initial value "33 msec" into the still picture transmission interval F1 and the moving picture transmission interval F2 stored in the transmission interval register (step S101).

Thereafter, the server device 10 executes the following processing when a bit map image is drawn on the frame buffer 13 and an image of an update rectangle which is obtained by joining pixels at a portion changed from a previous frame and then shaped to a rectangle is generated (Yes in step S102). That is, the server device 10 reads out the still picture transmission interval F1 and the moving picture transmission interval F2 from the transmission interval register (step S103).

The server device 10 generates a packet for update rectangle transmission from a previously generated update rectangle image (step S104), and accumulates the generated update rectangle into a working internal memory (not depicted) (step S105).

At this time, when a predetermined period does not elapse from the start of the accumulation of update rectangle (No in step S106), subsequent processing concerning identification of the high-frequency change area is skipped, and the processing goes to step S115 depicted in FIG. 8.

On the other hand, when the predetermined period elapses from the start of the accumulation of the update rectangle (Yes in step S106), the server device 10 executes the following processing. That is, the server device 10 successively develops the images of the update rectangles on the change frequency determining map according to the positions and sizes of the update rectangles accumulated in the working internal memory (step S107). The server device 10 obtains meshes having change frequencies exceeding the threshold value out of the meshes contained in the change frequency determining map (step S108).

Thereafter, the server device 10 determines whether any mesh whose change frequency exceeds the threshold value is obtained (step S109). At this time, when there does not exist any mesh whose change frequency exceeds the threshold value (No in step S109), no high-frequency change area exists on the desktop screen. Therefore, the subsequent processing concerning the identification of the high-frequency change area is skipped, and the processing goes to step S114.

On the other hand, when a mesh whose change area exceeds the threshold value exists (Yes in step S109), the server device 10 corrects a mesh joint body obtained by joining adjacent meshes to a rectangle (step S110).

When plural corrected rectangles, that is, plural high-frequency change area candidates exist (Yes in step S111), the server device 10 combines corrected rectangles so as to synthesize a rectangle containing plural high-frequency change area candidates which are spaced from one another at a predetermined distance value or less (step S112). When plural high-frequency change areas do not exist (No in step S111), the synthesis of the rectangle is not performed, and the processing goes to step S113.

Subsequently, the server device 10 transmits to the client terminal 20 the attribute information from which the position and size of the high-frequency change area can be specified (step S113). Then, the server device 10 clears the number of change times of the meshes mapped in the working internal memory (step S114).

Thereafter, as depicted in FIG. 8, when the animation is being executed (Yes in step S115), the server device 10 determines whether the moving picture transmission lapse time t2 reaches the transmission interval F2, that is, whether the transmission lapse time t2≥the transmission interval F2 is satisfied (step S116).

At this time, when the transmission lapse time t2≥the transmission interval F2 is satisfied (Yes in step S116), the server device 10 encodes the image of the high-frequency change area or change area to the moving picture encoded data (step S117).

On the other hand, when the transmission lapse time t2<the transmission interval F2 (No in step S116), the server device 10 skips the step S117 and shifts the processing to step S118 for broadening the transmission interval of the encoded data of the moving pictures.

Subsequently, the server device 10 determines whether the still picture transmission lapse time t1 reaches the transmission interval F1, that is, whether the transmission lapse time t1≥the transmission interval F1 (step S118).

At this time, when the transmission lapse time t1≥the transmission interval F1 is satisfied (Yes in step S118), the server device 10 encodes the update rectangle image to the still image encoded data (step S119).

On the other hand, when the transmission lapse time t1<the transmission interval F1 (No in step S118), the server device 10 skips the step S119 and shifts the processing to step S120 for broadening the transmission interval of the encoded data of the still pictures.

When the encoded data of the still images or moving pictures encoded through the processing of the step S117 or S119, that is, transmission data exist (Yes in step S120), the server device 10 executes the following processing. That is, after the server device 10 adds the header information containing the frame ID and the transmission time to the encoded data of either a still image or a moving picture (step S121), the server device 10 transmits the transmission data of the still picture encoded data and/or the moving picture encoded data to the client terminal 20 (step S122).

Thereafter, the server device 10 returns to the processing of the step S102, and repetitively executes the processing from the step S102 to the step S122 insofar as the client terminal 20 is being operated. When the power of the client terminal 20 is shut down, the server device 10 finishes the processing.

(2) Transmission Interval Changing Processing

Figure 9:
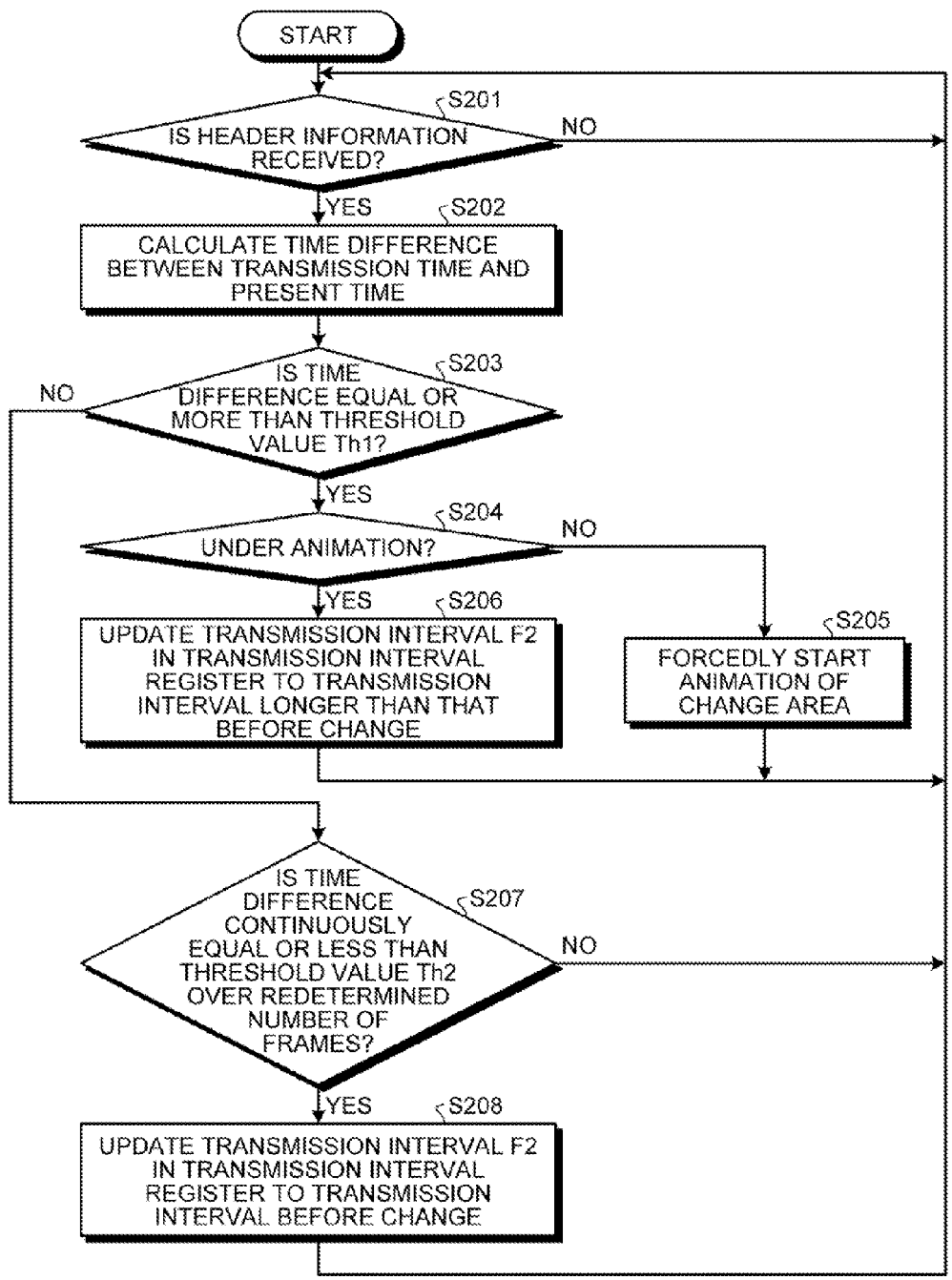
FIG. 9 is a flowchart depicting the procedure of transmission interval change processing according to the first embodiment.

Next, transmission interval changing processing according to the embodiment will be described. FIG. 9 is a flowchart depicting the procedure of the transmission interval changing processing according to the first embodiment. The transmission interval changing processing is executed by the server device 10, and it is repetitively executed insofar as the client terminal 20 is being operated.

As depicted in FIG. 9, when the return of the header information is received (Yes in step S201), the server device 10 subtracts the transmission time contained in the header information from the reception time at which the return of the header information is received, thereby calculating the time difference between the transmission time and the reception time (step S202).

The server device 10 determines whether the time difference between the transmission time and the reception time calculated as in the case of the step S201 is equal to the threshold value Th1 or more (step S203). At this time, when the time difference is not less than the Th1 (Yes in step S203), the server device 10 further determines whether the animation is being executed (step S204).

Here, when the animation has not yet been executed (No in step S204), it can be estimated that the encoded data of the still image of the update rectangle having a large data amount increases the traffic of the network with high probability. In this case, at the stage that the above determination is executed, the server device 10 brings the processing of determining the change frequency to an end, and inputs the image of the change area changed within the change frequency determining map to the second encoder 14g, thereby forcedly starting the animation (step S205).

On the other hand, when the animation is being executed (Yes in step S204), it can be estimated that the performance of the client terminal 20 is too deficient to decode the encoded data of the moving picture at the present frame rate. In this case, the server device 10 changes the moving picture transmission interval F2 to a longer transmission interval than that before the change (step S206).

Furthermore, when the time difference between the transmission time and the reception time is less than the threshold value Th1 (No in step S203), the server device 10 further determines whether the time difference between the transmission time and the reception time is equal or less than the threshold value Th2 over a predetermined number of frames (step S207).

At this time, when the time difference is not more than the threshold value Th2 over the predetermined number of frames (Yes in step S207), the server device 10 returns the moving picture transmission interval F2 to the transmission interval before the change (step S208). When the time difference is more than the threshold value Th2 over the predetermined number of frames (No in step S207), the server device 10 does not return the transmission interval, and shifts the processing to the step S201.

When the processing of the step S205, the step S206 or the step S208 is finished, the server device 10 returns the processing to the step S201, and repetitively executes the processing from the step S201 to the step S208 insofar as the client terminal 20 is being operated. When the power of the client terminal 20 is shut down, the server device 10 finishes the processing.

Effect of First Embodiment

As described above, in the server device 10 according to this embodiment, when the still picture of the update rectangle compresses the band of the network with high probability, the animation is forcedly started. Furthermore, in the server device 10 according to this embodiment, when the performance of the client terminal 20 does not follow the decoding of moving pictures, the transmission interval of the encoded data of the moving pictures is lengthened. Accordingly, according to the server device 10 of this embodiment, the drawing delay of the screen at the client side can be suppressed with suppressing the reduction of the operation response of the thin client.

Furthermore, when plural update area images exist, the server device 10 according to this embodiment adds the header information to the image of at least one update area. Therefore, in the server device 10 according to this embodiment, the drawing delay at the client side can be monitored on a frame basis by returning only the header information after the decoding of the moving picture encoded data and the drawing of the screen are performed at the client terminal 20. Accordingly, according to the server device 10 of this embodiment, the drawing delay can be monitored with harmonizing the tradeoff between the traffic of the network and each of the load of the client terminal 20 and the monitoring precision of the drawing delay.

Still furthermore, when no drawing delay occurs in the client terminal 20, the server device 10 according to this embodiment returns the transmission interval F2 for transmitting the moving picture encoded data to the transmission interval before the change. Accordingly, according to the server device 10 of this embodiment, when the client terminal 20 is restored from the transmission delay of the network or the drawing delay, the original operation response can be supplied without saving the transmission of the moving picture encoded data.

Second Embodiment

The embodiment relating to the disclosed device has been described above. However, the present invention may be implemented according to various different modes in addition to the foregoing embodiment. Therefore, another embodiment contained in the present invention will be described hereunder.

Extension of Map Clear

For example, in the first embodiment described above, the high-frequency change area identifier 14d clears the change frequency determining map in conformity with (in synchronization with) the update rectangle accumulating period. However, the timing at which the change frequency determining map is cleared is not limited to the above style.

As an example, even after the change frequency drops and does not exceed the threshold value in an area identified as a high-frequency change area, the high-frequency change area identifier 14d may continuously identify the area as the high-frequency change area over a predetermined period.

Figure 10A:
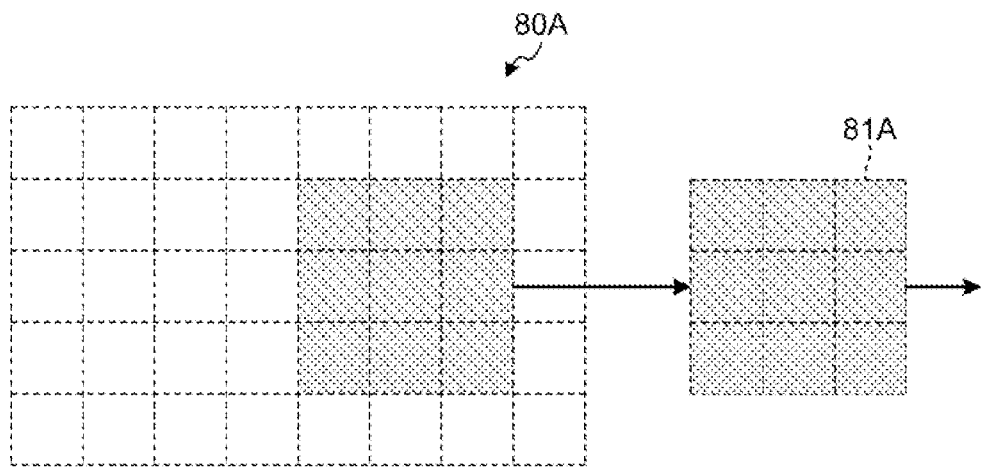
FIG. 10A is a diagram depicting the gist of extension of map clear.
Figure 10B:
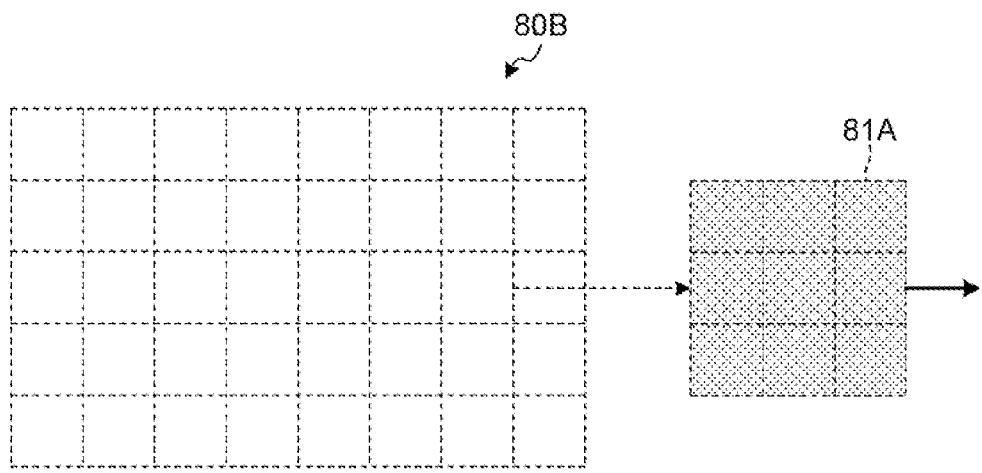
FIG. 10B is another diagram depicting the gist of the extension of the map clear.

FIGS. 10A and 10B are diagrams depicting the gist of extension of map clear. FIG. 10A depicts a change frequency determining map 80A at the time point when a high-frequency change area is first identified, and an identification result 81A of the high-frequency change area at that time point. Furthermore, FIG. 10B depicts a change frequency determining map 80B at a specific time point within a predetermined period from the time when the high-frequency change area is first identified, and an identification result 81A of the high-frequency change area at that time point.

As depicted in FIG. 10A, when a mesh joint body having the number of change times exceeding a threshold value is obtained on the map 80A and an identification result 81A of a high-frequency change area is obtained, the identification result 81A is taken over for a predetermined period even when there is not subsequently obtained any mesh joint body having the number of change times exceeding the threshold value. That is, as depicted in FIG. 10B, the identification result 81A of the high-frequency change area is taken over within the predetermined period after the identification result 81A of the high-frequency change area is first identified even when there is not obtained any mesh joint body having the number of change times exceeding the threshold value on the map 80A. An end user may select as the "threshold value" a value which is stepwise set by the developer of the remote screen control application at the server side, or the end user may directly set the "threshold value."

Accordingly, even when motion is intermittently stopped in an area where moving pictures are actually reproduced, the high-frequency change area is not intermittently identified, so that frame drop of images can be prevented from intermittently occurring in the high-frequency change area. Furthermore, the identification result of the high-frequency change area is taken over, so that the size of the high-frequency change area is stable. Therefore, the frequency at which parameters at the encoding time are initialized can be reduced, so that the load imposed on the encoder can be reduced.

Suppression of Contraction of High-Frequency Change Area

As another example, the high-frequency change area identifier 14d executes the following processing when an area identified as a high-frequency change area is more contractive than an area which was previously identified as the high-frequency change area. That is, the high-frequency change area identifier 14d takes over the area previously-identified as the high-frequency change area as a present identification result when the degree of the contraction concerned is not more than a predetermined threshold value.

Figure 11A:
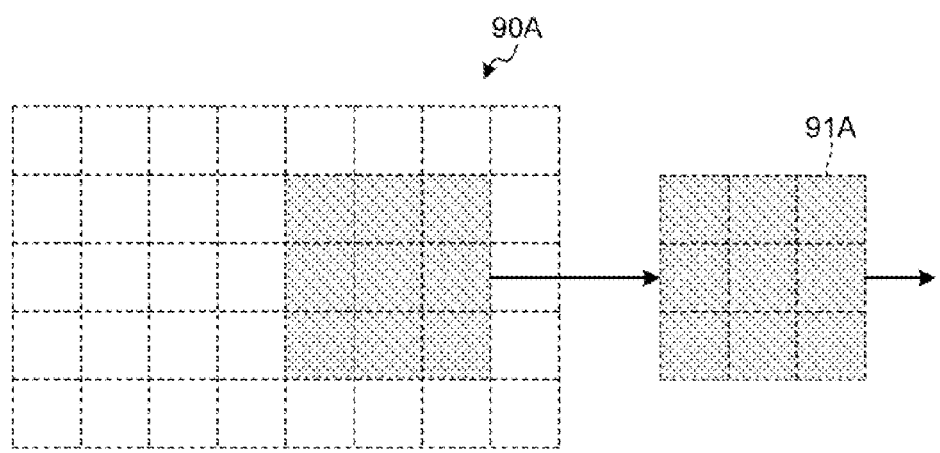
FIG. 11A is a diagram depicting the gist of suppression on contraction of a high-frequency change area.
Figure 11B:
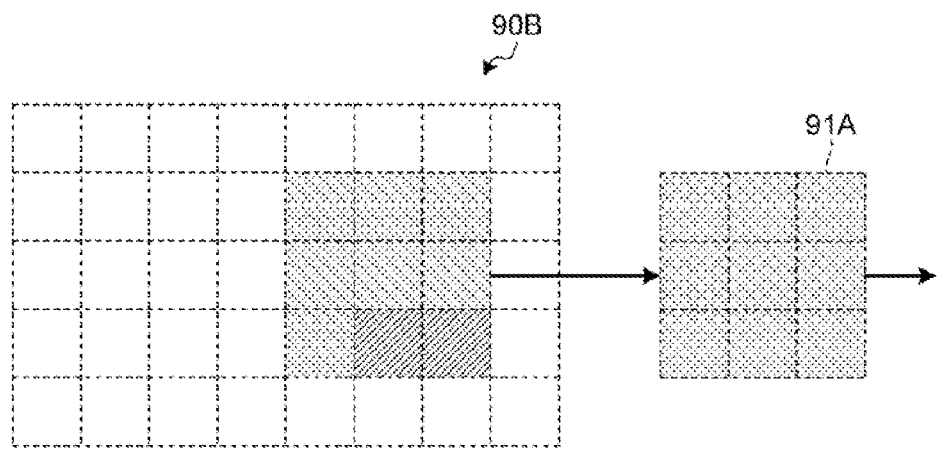
FIG. 11B is another diagram depicting the gist of the suppression on the contraction of the high-frequency change area.

FIGS. 11A and 11B are diagrams depicting the gist of suppression concerning the contraction of the high-frequency change area. FIG. 11A depicts a change frequency area determining map 90A and an identification result 91A of a high-frequency change area at a time point T1. FIG. 11B depicts a change frequency area determining map 90B and an identification result 91A of a high-frequency change area at a time point T2. The time point T1 and the time point T2 are assumed to satisfy T1<T2.

As depicted in FIG. 11A, in a case where a mesh joint body having the number of change times exceeding a threshold value is obtained on the map 90A and an identification result 91A of a high-frequency change area is obtained, the high-frequency change area is not immediately contracted even when the mesh joint body having the number of change times exceeding the threshold value is contracted. That is, as depicted in FIG. 11B, even when the mesh joint body having the number of change times exceeding the threshold value is contracted at a hatched portion thereof, the identification result 91A of the high-frequency change area is taken over under the condition that the contraction area of the hatched portion is equal to or less than a predetermined threshold value, for example, a half.

Accordingly, even when the motion is partly intermittent in an area where moving pictures are actually reproduced, the high-frequency change area is not intermittently identified, so that frame drop of images can be prevented from intermittently occurring in the high-frequency change area. Furthermore, since the identification result of the high-frequency change area is taken over, the size of the high-frequency change area is stable. Therefore, the initialization frequency of the parameters in the encoding operation can be reduced, so that the load imposed on the encoder can be reduced.

Multistage of Transmission Interval Change

In the first embodiment described above, the moving picture transmission interval F2 is set to be shifted between 33 msec as the initial value and 100 msec. However, the moving picture transmission interval F2 may be set to be shifted among three or more values. When the moving picture transmission interval F2 is set to be shifted among three or more values, the transmission interval may be set to be longer as the time difference between the transmission time and the reception time is larger.

Dispersion and Integration

The constituent elements of each device illustrated in the drawings need not be physically configured as illustrated. That is, the specific mode of dispersion/integration of the respective devices is not limited to one depicted in the figures, and all or some of the devices may be configured to be functionally or physically dispersed or integrated in arbitrarily units.

For example, the image transmission processing executed by the first transmitter 14f and the second transmitter 14h of the server device 10 may be integrally performed by one transmitter. Furthermore, the image reception processing executed by the first receiver 23b and the second receiver 23e of the client terminal 20 may be integrally performed by one image receiver. Still furthermore, the display control processing executed by the first display controller 23d and the second display controller 23g of the client terminal may be integrally performed by one display controller.

Image Transmission Program

Various kinds of processing described with respect to the embodiments described above may be implemented by executing a prepared program with a computer such as a personal computer or a workstation. Therefore, in the following description, by using FIG. 12, an example of a computer which has the same function as the above embodiments and executes an image transmission program will be described.

Figure 12:
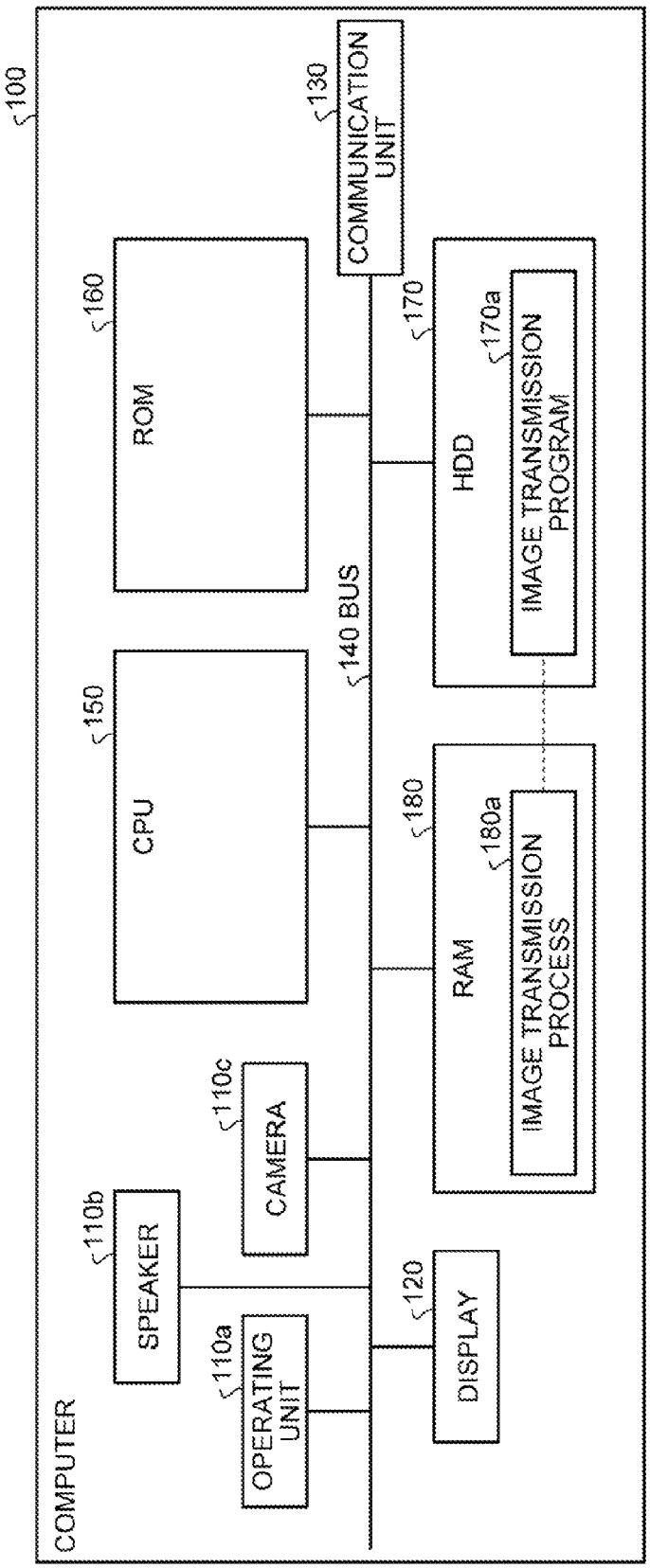
FIG. 12 is a diagram depicting an example of a computer for executing an image transmission program according to the first embodiment and a second embodiment.

FIG. 12 is a diagram depicting an example of the computer for executing the image transmission program according to the first and second embodiments. As depicted in FIG. 12, a computer 100 has an operating unit 110a, a speaker 110b, a camera 110c, a display 120 and a communication unit 130. Furthermore, the computer 100 has a CPU 150, a ROM 160, an HDD 170 and a RAM 180. These parts 110 to 180 are connected to one another through a bus 140.

As depicted in FIG. 12, an image transmission program 170a performing the same function as the remote screen controller 14 at the server side depicted with respect to the first embodiment is pre-stored in the HDD 170. The image transmission program 170a may be arbitrarily integrated or separated as in the case of the respective constituent elements contained in each remote screen controller 14 depicted in FIG. 1. Namely, all data stored in the HDD 170 does not always have to be stored in the HDD 170, and a part of data for processes may be stored in the HDD 170.

The CPU 150 reads out the image transmission program 170a from the HDD 170, and develops the read-out image transmission program 170a into the RAM 180. Accordingly, the image transmission program 170a functions as an image transmission process 180a as depicted in FIG. 12. The image transmission process 180a arbitrarily develops various kinds of data read out from the HDD 170 into corresponding areas allocated to the respective data on the RAM 180, and executes various kinds of processing based on the thus-developed various kinds of data. The image transmission process 180a contains the processing executed in the remote screen controller 14 depicted in FIG. 1, for example, the processing depicted in FIGS. 7 to 9. Furthermore, all the processing units virtually realized on the CPU 150 do not always have to operate on the CPU 150, and only the processing unit for the process just has to be virtually realized.

Incidentally, the image transmission program 170a does not always have to be stored in the HDD 170 or the ROM 160 from the beginning. For example, each program may be stored in a "portable physical medium" such as a flexible disk, so-called FD, a CD-ROM, a DVD disk, a magnetooptical disk or an IC card that is to be inserted in the computer 100. The computer 100 may obtain and execute each program from the portable physical medium. Furthermore, each program may be stored in another computer, a server device or the like which is connected to the computer 100 through a public line, the Internet, LAN, WAN or the like, and the computer 100 may obtain each program from the other computer or the server device and execute the program.

According to one aspect of the information processing device disclosed in this application, there is attained an effect that drawing delay on a screen at a client side can be suppressed with suppressing reduction of operation response of a thin client.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention

What is claimed is:

1. An information processing device includes
a memory; and
a processor coupled to the memory, wherein the processor executes a process comprising:
updating an image that includes a desktop screen image displayed on a terminal device connected through a network, the image representing a processing result based on software and being stored into an image memory that stores an image;
identifying in the image a high-frequency change area that is an area updated with a frequency not less than a predetermined threshold value during a redetermined period;
encoding the high-frequency change area in a moving picture compression format;
transmitting to the terminal device at least one of an encoded image of a change area in the image, the change area being updated with a frequency less than the predetermined threshold value during the predetermined period and the encoded high-frequency change area, with adding time information thereto, the encoded high-frequency change area being transmitted at a first transmission interval;
receiving the time information from the terminal device;
determining based on a difference between the received time information and a reception time of the time information whether drawing delay of the desktop screen image occurs in the terminal device; and
starting encoding the change area in a moving picture compression format when the drawing delay occurs or changing the first transmission interval to a second transmission interval longer than the first transmission interval when the drawing delay occurs and the encoded high-frequency change area is transmitted at the first transmission interval.

2. The information processing device according to claim 1, wherein when a plurality of change areas exist in the image, the transmitting includes adding the time information to at least the encoded image of one change area of the plurality of chance areas.

3. The information processing device according to claim 1, wherein when the determining includes determining that no drawing delay occurs, the transmitting includes transmitting the encoded high-frequency change area at the first transmission interval.

4. An image transmission method causing a computer to execute a process comprising:

updating, using a processor, an image that includes a desktop screen image displayed on a terminal device connected through a network, the image representing a processing result based on software and being stored into an image memory that stores an image;

identifying, using the processor, in the image a high-frequency change area that is an area updated with a frequency not less than a predetermined threshold value during a predetermined period;

encoding, using the processor, the high-frequency change area in a moving picture compression format;

transmitting, using the processor, to the terminal device at least one of an encoded image of a change area in the image, the chance area being updated with a frequency less than the predetermined threshold value during the predetermined period and the encoded high-frequency change area, with adding time information thereto, the encoded high-frequency change area being transmitted at a first transmission interval;

receiving, using the processor, the time information from the terminal device;

determining, using the processor, based on a difference between the received time information and a reception time of the time information whether drawing delay of the desktop screen image occurs in the terminal device; and starting, using the processor, encoding the change area in a moving picture compression format when the drawing delay occurs or changing the first transmission interval to a second transmission interval longer than the first transmission interval when the drawing delay occurs and the encoded high-frequency change area is transmitted at the first transmission interval.

5. A non-transitory computer readable storage medium having stored therein a program that causes a computer to execute an image transmission process comprising:

updating an image that includes a desktop screen image displayed on a terminal device connected through a network, the image representing a processing result based on software and being stored into an image memory that stores an image;

identifying in the image a high-frequency change area that is an area updated with a frequency not less than a predetermined threshold value during a predetermined period;

encoding the high-frequency change area in a moving picture compression format;

transmitting to the terminal device at least one of an encoded image of a change area in the image, the change area being updated with a frequency less than the predetermined threshold value during the predetermined period and the encoded high-frequency change area, with adding time information thereto, the encoded high-frequency change area being transmitted at a first transmission interval;

receiving the time information from the terminal device;

determining based on a difference between the received time information and a reception time of the time information whether drawing delay of the desktop screen image occurs in the terminal device; and starting encoding the change area in a moving picture compression format when the drawing delay occurs or changing the first transmission interval to a second transmission interval longer than the first transmission interval when the drawing delay occurs and the encoded high-frequency change area is transmitted at the first transmission interval.

\* \* \* \* \*